H. OLAFSON.
SLIDING DOOR FOR AUTOMOBILE BODIES.
APPLICATION FILED JAN. 13, 1913.
1,143,062.
Patented June 15, 1915.
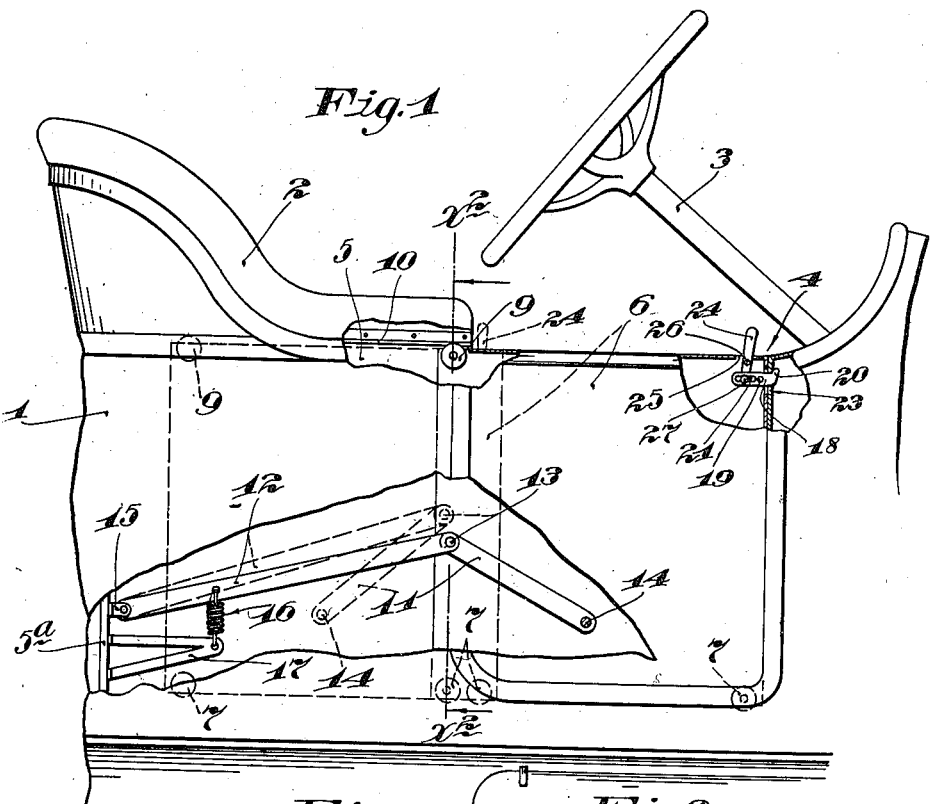
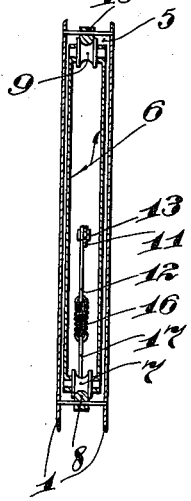
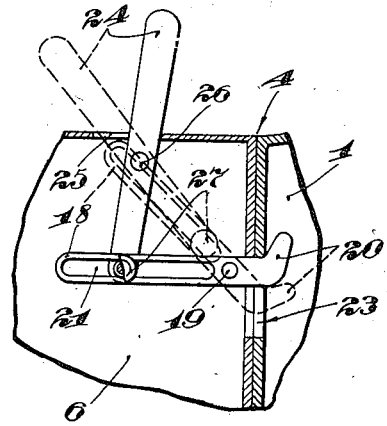
Witnesses:
Geo. Knutson
A. H. Opsahl
Inventor:
H. Olafson
By his Attorneys;
Williamson & Merchant

UNITED STATES PATENT OFFICE.

HALVOR OLAFSON, OF BOWDON, NORTH DAKOTA.

SLIDING DOOR FOR AUTOMOBILE-BODIES.

1,143,062.  Specification of Letters Patent.  Patented June 15, 1915.

Application filed January 13, 1913. Serial No. 741,721.

*To all whom it may concern:*

Be it known that I, HALVOR OLAFSON, a citizen of the United States, residing at Bowdon, in the county of Wells and State of North Dakota, have invented certain new and useful Improvements in Sliding Doors for Automobile-Bodies; and I do hereby declare the following to be a full, clear, and exact description of the invention, such as will enable others skilled in the art to which it appertains to make and use the same.

My invention has for its object to provide a sliding door for automobile bodies which has many advantages over the swinging door now in general use. One of these advantages is that when the sliding door is open, the same is entirely out of the way and hidden from view. Another advantage is that in hot weather the sliding door may be left open, thereby making riding much more comfortable. Swinging doors can not be left open while the car is in motion, for the reason that the same are liable to strike an object in the road, and also on account of the strain on the hinges.

To the above ends, generally stated, the invention consists of the novel devices and combinations of devices hereinafter described and defined in the claims.

The invention is illustrated in the accompanying drawings, wherein like characters indicate like parts throughout the several views.

Referring to the drawings: Figure 1 is a view in side elevation, showing a portion of an automobile body having my invention incorporated therein; Fig. 2 is a transverse vertical section, taken on the line $x^2$ $x^2$ of Fig. 1; and Fig. 3 is a detail view partly in side elevation and partly in longitudinal vertical section, showing the lock for holding the sliding door closed.

Referring first to the parts of the automobile necessary for the purpose of illustrating my invention, the numeral 1 indicates the automobile body, the numeral 2 the front seat, and the numeral 3 the steering wheel and post. Formed in the body 1 adjacent to the seat 2 is a door opening 4, and at one side of the seat 2, between the inner and outer walls of the body 1, is a door receiving pocket 5, that opens into one of the vertical edges of the door 4.

Referring now to my invention, the numeral 6 indicates a door slidably mounted in the pocket 5 and arranged to close the door opening 4. As shown, the improved door is preferably pressed from sheet metal in the form of a hollow box, having its inner vertical edge open, the purpose of which will presently appear. Journaled at the lower corners of the door 6 is a pair of grooved truck wheels 7, arranged to run on a horizontally extended half round track rail 8, rigidly secured to the bottom of the door opening 4 and the pocket 5. A third wheel 9 is journaled in the upper inner corner of the door 6. This truck wheel 9 is also grooved and arranged to run on a horizontally extended track wheel 10, located directly over the track 8, and rigidly secured to the top of the pocket 5.

A toggle lever is provided for yieldingly holding the door 6 in either its open or closed position. This lever is also arranged to complete the closing and opening movements of the door. The toggle lever comprises a short arm 11 and a long arm 12, pivotally connected, at their inner ends, by a pin 13. The arm 11 of the toggle lever is extended through the open vertical end of the box-like door 6, and its outer end is pivotally secured thereto by a pin 14, extended horizontally through the door 6 and anchored, at its ends, to the side walls thereof. The outer end of the arm 12 of the toggle lever is extended into the pocket 5 and its outer end is pivotally anchored to a bracket 15, rigidly secured to the rear vertical wall $5^a$ of the pocket 5. A coiled spring 16 is anchored, at one end, to the intermediate portion of the long arm 12 of the toggle lever and to a bracket 17, located directly under the bracket 15 and rigidly secured to the wall $5^a$. This spring 16 tends to straighten the toggle lever, to yieldingly hold the door 6 closed, and tends to hold the toggle lever buckled, to yieldingly hold the door in an open position.

To prevent any tendency of the door 6 to open, against the tension of the spring 16, while the car is in motion, a latch of novel construction is provided which positively holds the door closed. This latch is in the form of a lever 18, mounted within the door 6, and pivotally secured thereto by a pivot pin 19, passed intermediately through the latch lever 18 and anchored, at its ends, to the inner and outer walls of the door 6. The short end of the latch lever 18 terminates in a cam acting head 20 and the long head thereof is provided with an elongated slot 21. The cam head 20 projects through an opening 22 formed in the front vertical edge wall of the door 6 and is arranged, when said door is closed, to enter a slot 23 formed in that portion of the car body 1 which forms the right vertical side, with respect to Fig. 1, of the door opening 4. For operating the latch lever 18, a hand lever 24 is extended through a slot 25 formed in the top of the door 6 and is intermediately pivoted to a horizontally extended pin 26 passed through the door 6 and anchored, at its ends, to the inner and outer side walls thereof. The inner end of the lever 23 is connected to the inner end of the latch lever 18 by a roller-equipped stud 27, journaled on the lower end of the lever 24 and slidably works in the slot 21 of the latch lever 18.

When the hand lever 24 is in the position indicated by full lines in Fig. 3, the same is moved slightly beyond a dead center and holds the cam head 20 of the latch lever 18 interlocked with the body portion 1 of the automobile under a cam-like action, thereby drawing the sliding door into tight engagement with the body portion 1. When the latch lever 24 is turned into a position as indicated by dotted lines in Fig. 3, the latch lever 18 is turned into a position to permit its cam head 20 to be freely moved into and out of the slot 23.

By making the door hollow and mounting the toggle lever therein, said toggle lever is entirely hidden from view and said door and toggle lever can be mounted in a very compact space.

The above described device, while extremely simple and with few parts to get out of order, is thought to be highly efficient for the purpose had in view.

What I claim is:—

1. The combination with a vehicle body, having a door opening, of a sliding door for closing said door opening, and a toggle lever, the arms of said toggle being pivotally secured, one to the vehicle body and the other to the sliding door, said toggle arranged to close said sliding door under a straightening movement thereof, and to open said door under a buckling movement thereof, the entire movement of the joint of said toggle being imparted by the buckling and straightening of said toggle, the movement of said joint being sufficient to permit the toggle arm, which is pivotally secured to said door, to move from one side to the other of a vertical position, and yielding means tending to hold said toggle in either of its extreme positions.

2. The combination with a vehicle body, having a door opening, of a sliding door for closing said door opening, a toggle lever, the arms of said toggle being pivotally secured, one to the vehicle body and the other to the sliding door, said toggle arranged to close said sliding door under a straightening movement thereof, and to open said door under a buckling movement thereof, the entire movement of the joint of said toggle being imparted by the buckling and straightening of said toggle, the movement of said joint being sufficient to permit the toggle arm, which is pivotally secured to said door, to move from one side to the other of a vertical position, and a spring, tending to hold said toggle in either of its extreme positions.

3. The combination with a vehicle body having a door opening and a pocket formed between the inner and outer walls of said body at one side of said door opening, of a hollow sliding door mounted in said pocket for closing said door opening, a toggle lever comprising a long arm and a short arm, secured, respectively, to the vehicle body and the sliding door, working in said pocket and hollow door, and arranged to hold said sliding door in either its closed or open positions, said long arm being of a length greater than the sliding movement of said door and said short arm being of a length less than the sliding movement of said door, but more than one-half thereof, and a spring tending to hold said toggle lever in either of its extreme positions.

In testimony whereof I affix my signature in presence of two witnesses.

HALVOR OLAFSON.

Witnesses:
 HILDA OLAFSON,
 J. F. McENTEE.